United States Patent Office 2,789,059
Patented Apr. 16, 1957

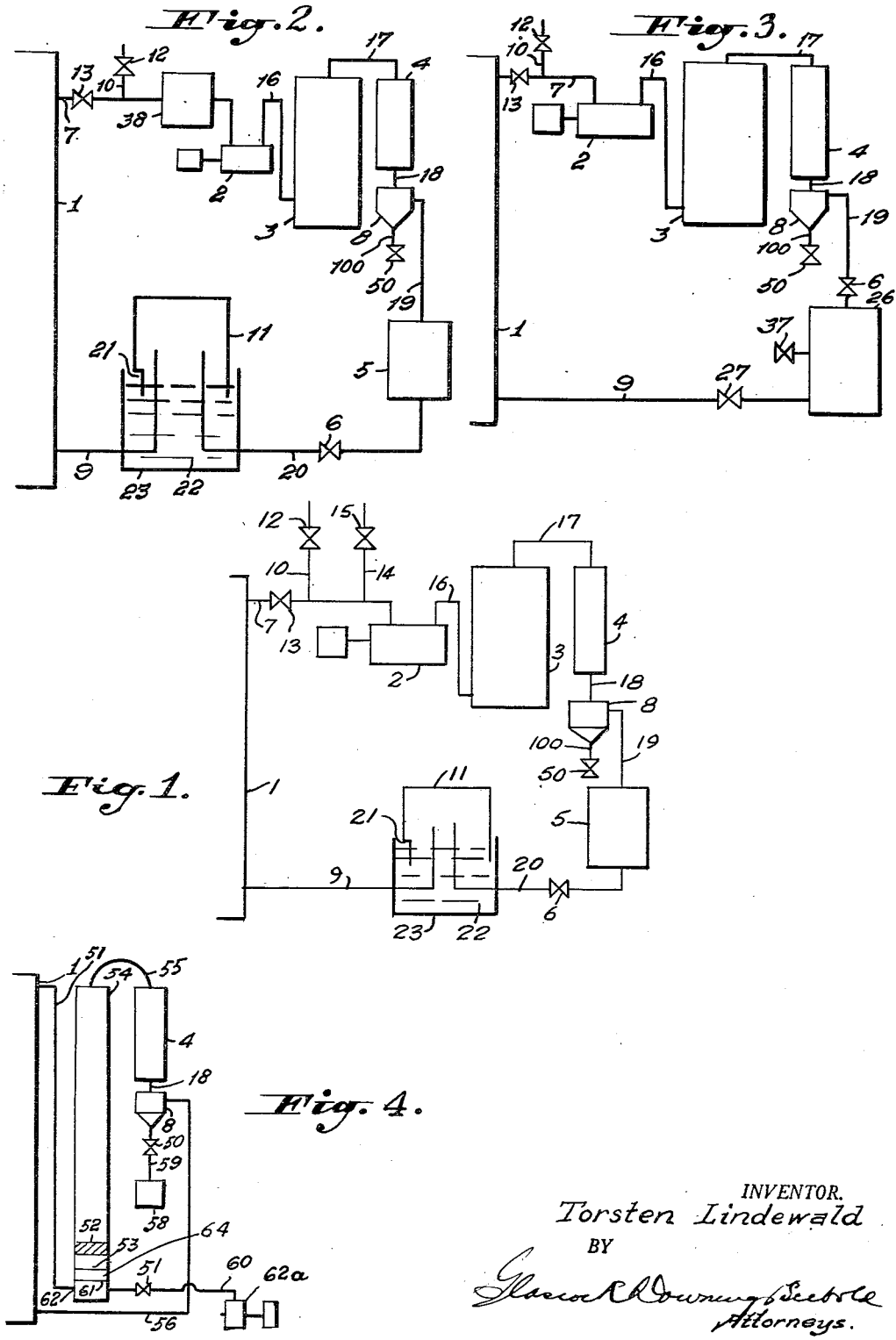

2,789,059

METHOD FOR STORING OXIDIZABLE ORGANIC PRODUCTS IN A GASTIGHT STORAGE CHAMBER HAVING AN INERT GAS ATMOSPHERE THEREIN

Torsten Lindewald, Stockholm, Sweden

Application September 19, 1952, Serial No. 310,436

Claims priority, application Sweden September 24, 1951

2 Claims. (Cl. 99—189)

This invention relates to a method for storing oxidizable organic products, including food products, from which the enzymes have been eliminated and/or in which the enzymes have been inactivated by heat treatment, drying, in gastight storage chambers having an inert gaseous atmosphere therein for the purpose of enabling such products to be kept unharmed and unchanged for a comparatively long period of time, said method comprising removing both the gaseous oxygen present in the chamber and the oxygen occluded in the organic product by reaction with oxidizable gas added to the system and circulated over a catalyst in a container maintained separate from and in communication with the said storage chamber.

The oxidizable substance in the gaseous state is introduced into the gas to be freed from the oxygen therein thus forming an admixture therewith, and said admixture is circulated over an oxidation catalyst such as platinized asbestos which is maintained at a minimum temperature of 100° C. by the introduction thereto of a constant heat quantity per unit of time.

Some oxidizable vapors give off, when contacted with the oxygen, volatile products, which sometimes have strong odors. Gaseous or vaporous oxidizable substances can easily be introduced in excess. When carrying out the method utilizing therein a gaseous oxidizable substance and the oxidation catalyst, it is sometimes preferable to pass the oxygen-free gas through a layer of a substance, for example, activated charcoal, which absorbs the volatile products formed.

The gas from which the oxygen is to be removed can pass out of the storage chamber at the top thereof and return after the removal of the oxygen therefrom to said chamber at the bottom thereof. The increase in the oxygen content of the storage chamber atmosphere is due to several factors, among them being leakage in the walls of the storage space and diffusion of the oxygen from the goods stored through the walls of the packages therefor.

Preferably, the gas in the storage chamber is maintained at a pressure greater than the pressure of the surrounding air and at a pressure equal to the highest air pressure in the locality where said storage chamber is located.

Also, it has been found preferable to provide for the automatic starting of the gas circulation when the oxygen content in the storage chamber rises above the desired predetermined value, which usually is a maximum of about 0.1% by weight of the product but can be about 0.01% by weight of the product or even lower, and for the automatic stopping of the gas circulation when the oxygen content reaches the desired lower value.

Also, it is preferable to maintain the temperature in the storage chamber constant, for example, +2° C. or —20° C., and to maintain the humidity constant herein, depending upon the nature of the goods stored therein.

It is of extreme importance that the oxygen gas content in the storage space be lowered quickly and to such a low value that the quantity of available oxygen which contacts the oxidizable organic products and reacts with the unsaturated organic compounds therein containing one or more double bonds be at a maximum of 0.1–0.2% by weight of the products therein. By carrying out the methods here, utilizing the means therefor, the oxygen content can be lowered to a point where the oxygen is as low as 0.05–0.01% by weight of the products stored and, if required, as low as 0.025–0.005%, or less, by weight of the products stored.

A suitable arrangement for carrying out the aforesaid methods comprises a gas circulation means providing one or more containers or reactors having an oxidation catalyst therein so positioned that the contact surface between the oxygen-containing air and oxidation catalyst is large, and, as may be required, other means such as coolers, provided with liquid separators, absorbents for moisture and/or impurities in the gas, and means for regulating the pressure or absolute pressure in the storage space.

An object of this invention is to provide a method for removing oxygen from a storage chamber in which oxidizable organic products including fatty and other lipid containing food products are to be kept wherein the oxygen is removed from said chamber forming therein an inert gas atmosphere.

Other objects and features of this invention will become apparent from the following detailed description.

Figure 1 is a diagrammatic view of one embodiment of the apparatus used.

Figure 2 is a diagrammatic view of a second embodiment of the apparatus used,

Figure 3 is a diagrammatic view of a third embodiment of the apparatus used, and Figure 4 is a diagrammatic view of a fourth embodiment of the apparatus used.

Similar reference numerals are used throughout to designate corresponding parts.

The invention will be further understood by reference to the following specific examples which are intended as illustrations only and not as in any way limiting the invention.

*Example I*

Reference is here made to Figure 1. A storage chamber 1 is provided, having at the top portion thereof an opening for receiving a conduit 7 which is connected to a fan or compressor 2, which is so constructed that it is free of oil packing surfaces, for example, the Roots and the Lysholms compressor, as well as various other turbo-compressors. The gas compressed in the compressor 2 passes through the conduit 16 to a container or reactor 3, having disposed therein an oxidation catalyst, for example, platinum on a carrier, thus creating a large contact surface. The catalyst in finely divided form is disposed on a suitable carrier such as pumice stone pieces, silica gel or the like such as the aforementioned asbestos, in such a way that contact surface thereof for the air to be treated thereby is large. The conduit 7 is provided with a branch conduit 14, in which there is disposed an automatically controlled valve 15 arranged to open when the compressor 2 is started, and through which there is introduced a gaseous or vaporous oxidizable substance, for example, water gas, methane, benzene, alcohol or other hydrocarbons including butane as mentioned above. When such a vaporous oxidizable substance is used the absorber 5 is disposed after the cooler 4 and the liquid separator 8, in which absorber 5 the surplus gaseous or vaporous oxidizable substance is trapped. From the reactor 3 the gas passes through conduit 17 to a cooler 4, and from the cooler 4 through conduit 18 to a water separator 8, in which the water which has been condensed in the cooler is separated from the gas. If the oxidizable material imparts an odor to the gas, the gas is passed through the conduit 19 to an absorbent 5 containing an absorber such as activated charcoal which adsorbs the volatile products causing the said odor. The gas, from which the oxygen, the excess moisture, and the volatile products causing the odor have been removed, is passed through the conduit 20, the gas bell 11, and the conduit 9 to the lower portion of the storage chamber 1. The gas bell 11 is of such dimensions that it is able to compensate for all or part of the volume variation of the gas enclosed in the storage space 1 corresponding to the variation of the pressure of the air therein. The gas bell 11 also serves as a pressure regulator and maintains constant the pressure difference between the air outside the storage chamber 1 and the air inside the storage chamber 1. There is provided close to the lower portion of the gas bell an opening 21 through which the gas can leave when the bell 11 rises above the surface of the sealing liquid 22 in the container 23.

The storage chamber 1 is provided with means (not shown) for maintaining the temperature and moisture content of the air in the interior thereof constant. The means for maintaining the moisture content of the air therein constant may consist of a cooling surface means disposed in the upper portion of the storage chamber 1, said cooling surface means including cooling coils, lamella battery, or the like, through which there is circulated a coolant such as a calcium chloride solution, which coolant is maintained at the temperature corresponding to the dew point at the desired moisture content. Since this temperature may fall below 0° C., causing an ice formation on the cooling means, the cooling surface is provided with means for raising the temperature of the air in storage chamber 1, thus causing the ice formed to melt. The means for maintaining the temperature constant may consist of a cooling-heating surface means such as a lamella battery disposed in the upper portion of the storage space 1, in which cooling-heating means a cooling-heating medium is circulated, which medium is automatically maintained at such a temperature that it takes in or gives up the same quantity of heat as the gas in the storage chamber takes from or gives to its environment. The cooling-heating surface is of such dimensions that at the highest exterior temperature occurring there will not occur a temperature in the storage space lower than that corresponding to the dew point of the desired moisture content. This cooling-heating surface may, of course, also be disposed outside the storage chamber 1, in which instance the gas from the storage space is circulated over the cooling-heating surface.

Since the dimensions of the storage chamber 1 are comparatively large, it is impractical to construct its walls so thick that they will be able to withstand pressure stresses normally occurring with the variation in the exterior air pressure especially in view of the fact that the gas pressure in the storage chamber 1 and thus the volume of the gas are maintained constant.

Since the volume of the gas in the storage chamber 1 is decreased as a result of the removal of the oxygen therefrom, there is a decrease in the gas pressure in the storage chamber which must be compensated for. The conduit 7, therefore, is provided with a branch conduit 10 having disposed therein an automatically controlled valve 12, arranged so that it will open when the gas pressure in conduit 7 goes below atmospheric pressure and thus allow more gas to be introduced into the chamber 1. The conduit 7 is also provided with an automatically controlled valve 13 arranged so that it will open when the gas bell 11 rises above a certain limit position.

The compressor 2 is provided with means for automatic starting when the oxygen gas content in the storage chamber 1 goes above the desired maximum value when the gas bell 11 reaches a lower limit and means for automatic stopping when the oxygen gas content in the storage chamber 1 goes below the desired minimum value and/or the gas bell 11 reaches an intermediate limit position.

At times it is desirable to maintain a higher pressure in the reactor 3, the cooler 4 and the absorber 5 in order to be able to decrease the respective dimensions thereof and to increase the partial pressure of the oxygen gas in the reactor 3. In this case, an automatically controlled valve 6 must be provided in the conduit 20 so arranged that it will open when the pressure in the storage space 1 goes above the desired value.

*Example II*

Reference is here made to Figure 2. There is provided in the system as shown in the conduit 7 therein between the compressor 2 and the storage chamber 1, instead of the branch conduit 14 and the automatically controlled valve 15, as shown in Figure 1, an automobile carburetor 38, in which a readily volatile oxidizable substance is gasified.

*Example III*

Reference is made to Figure 3. The storage chamber 1, the compressor 2, the reactor 3, the cooler 4, the liquid separator 8, the conduits 7, 9, 10, 16, 17, 18, and 19, and the valves 12 and 13 are arranged as shown. The valve 6 is disposed in conduit 19. Instead of the gas bell 11 there is disposed between the liquid separator 8 and the storage chamber 1, a pressure bell 26. Conduit 19 connects the pressure bell 26 with the storage chamber 1. In conduit 9 is disposed an automatically controlled valve 27 arranged to open when the absolute pressure in the storage chamber 1 goes below a desired value and to close when the absolute pressure goes above an upper limit value. The compressor 2 has connected therewith means for automatically starting when the absolute pressure of the gas in the storage chamber 1 goes above the upper limit value and for automatically stopping when the absolute pressure of the gas in the storage chamber 1 goes below a desired value. The pressure bell 26 is provided with an automatic pressure release valve 37, which automatically opens and releases the gas from the system when the pressure of the gas in the bell goes above the highest permissible value.

*Example IV*

Reference is made to Figure 4. Leading from the upper portion of the storage chamber 1 a conduit 51 is provided connecting the storage chamber 1 to the lower part 62 of a reactor 54 which is constructed as a tall chimney-like container. Directly above 62 in well 54 there is provided a wick 64 in the form of a horizontal network which has therein means for keeping it wetted with a liquid readily vaporizable oxidizable substance, for example, alcohol. Above this wick in the reactor 54 there is disposed a layer 52, as shown, of an oxidation catalyst, for example, platinized asbestos, disposed on a porous carrier. Above this layer 52 the reactor 54 is empty, and the walls of said reactor 54 are well insulated to retain the heat therein. The lower surface of the catalyst layer 52 is maintained in a heated state by a heating coil 53, which is disposed directly beneath it, as shown. The gas present in and about the layer 52 and the heating coil 53 is heated and ascends in the reactor 54, which thus acts like a chimney. By radiant heating, utilizing the heating coil 53 and the catalyst layer 52, a quantity of the alcohol on the wick 61 is vaporized and is entrained in the gas passing through the catalyst layer 52. Thus there is liberated heat energy, which brings about a rise in the temperature of the catalyst layer 52. As a result of this increased temperature, the circulation of the gas is accelerated as is the vaporization of the alcohol.

The gas circulation is automatically regulated in such a way that it is relatively slow when the oxygen content thereof is low and relatively rapid when the oxygen content thereof is high, and the same also applies to the evaporation velocity of the alcohol.

From the upper end of the reactor 54 a U-shaped conduit 55 is connected to the cooler 4, as shown, in which the excess alcohol and the water present in the gas are both condensed and conducted through conduit 18 to the liquid separator 8 and then to a supply vessel 58 through conduit 59 having disposed therein the valve 50. From the liquid separator 8 the gas is passed through conduit 56 to the lower portion of storage chamber 1.

At the lower end of the reactor 54 there is connected a conduit 60 as shown, leading from a pressure fan 62a, which maintains the air pressure in the system. The magnitude of the pressure depends upon the stability of the walls of the storage chamber 1. If the latter are weak, and consist of ordinary brick or wood lined with a gas impermeable layer, only a gas under low pressure can be used, and the pressure of the gas inside the system must be in accordance with the variations in the pressure of the air or gas on the outside of the storage chamber, so that at a decrease in the pressure of the air surrounding the storage chamber 1 the gas is pulled out of the chamber 1 by the fan 62a and at a rise in the pressure of the air surrounding the chamber 1 the gas is pushed into the chamber 1 by the fan 62a. If, however, the walls of the storage space 1 are comparatively strong, that is, they are formed of reinforced concrete, or consist of the walls of a cellar, then the pressure of the gas inside the system can be maintained constant at or somewhat above the highest air pressure occurring in the locality wherein the system is utilized. Here the fan 62a is arranged to produce this pressure when at the lowest air pressure occurring, and in the conduit 60 there is provided an automatically controlled valve so arranged that it opens when the pressure of the gas in the system drops below a predetermined value and to close when the predetermined value is again reached. In this case the capacity of the fan can be considerably less than that of the fan in the first instance.

The storage chamber 1 may consist of an ordinary storeroom in an existing building and may have a volume ranging from a few hundred to a few thousand cubic meters. The storeroom is made gastight by lining the walls thereof with iron or aluminum sheeting and welding said sheeting at the seams thereof. Access to the storage chamber 1 for putting in and removing therefrom oxidizable products during the treatment of the inert gas for the removal of the oxygen therefrom and while there is an inert gas atmosphere in the chamber 1 can be brought about by using double gas-tight doors with closing arrangements. If access to the storage chamber 1 is not desired while the products are placed in a substantially oxygen free atmosphere, the openings for putting the oxidizable products into the storage chamber 1 can be welded shut. The storage chamber can also be utilized as a storeroom in a cellar. Here, because of the comparatively low permeability to oxygen and moisture of some rocks which make up the cellar walls, it is not always necessary to provide for special sheet metal lining for the walls in order to obtain a satisfactory gastight storage chamber.

The walls, ceiling and floor of the storage chamber may be made gastight by lining them with thin metal sheets or with metal foil, which are fastened by gluing them together with overlapping joints and/or joints covered with metal-foil tape by means of a suitable metal glue. This gluing is facilitated by placing the storage space under a gas pressure, using a fan, thereby causing the sheets or foils to be forced against the walls of said space, said walls being more or less gas permeable.

Also, metal foil wrapping paper can be used for lining the walls of the storage space. This paper is fastened to the walls with ordinary wallpaper paste, and the joints thereof are tightened with narrow metal foil tape, which is secured, by means of a suitable metal glue, to the wall at said joints or seams.

In Figures 1–3 and the corresponding examples, the conduit 100 depends from the liquid separator 8. Disposed at the end of said conduit is the valve 50 which is opened at any time that it is desired to withdraw the liquid in 8.

Further, branch conduit 14 having disposed therein valve 15 may be utilized in the apparatus of Figure 3 in the same manner as said conduit 14 and valve 15 were utilized in the apparatus of Figure 1. Likewise, automobile carburetor 38 may be utilized in the apparatus of Figure 3 in the same manner as it was utilized in the apparatus of Figure 2.

Many alterations and changes can be made without departing from the spirit and scope of this invention which is set forth in the appended claims which are to be construed as broadly as possible in view of the prior art.

I claim:

1. Method of storing oxidizable organic products in a substantially gas-tight storeroom, comprising withdrawing atmospheric gas contained in said storeroom at a pressure at least about as high as atmospheric and continuously circulating said gas in admixture with a gaseous oxidizable substance over an oxidation catalyst to eliminate oxygen contained in said gas, and recycling the inert residual gas to the gas-tight storeroom to reduce the oxygen content therein to less than about 0.1%.

2. Method of storing oxidizable food products in a gas-tight storeroom maintained at approximately atmospheric pressure and at a temperature of approximately +2 to −20° C., comprising withdrawing the gaseous atmosphere of said storage chamber containing said oxidizable food product at a positive pressure exceeding atmospheric and circulating the same together with a gaseous oxidizable substance over an oxidation catalyst to eliminate the oxygen contained in said gas, adjusting the moisture content of said gas, and continuously recycling the same to said gas-tight storage chamber until the oxygen content of the atmosphere therein is below the range of 0.01 to 0.1%.

References Cited in the file of this patent

UNITED STATES PATENTS

| | | |
|---|---|---|
| 52,650 | Smith | Feb. 13, 1866 |
| 1,532,831 | Mastin | Apr. 7, 1925 |
| 1,798,733 | Hasche | Mar. 31, 1931 |
| 2,063,245 | Haeseler | Dec. 8, 1936 |
| 2,086,778 | Peffer et al. | July 13, 1937 |
| 2,351,853 | Graham | June 20, 1944 |
| 2,353,029 | Graham | July 4, 1944 |
| 2,353,538 | Barber | July 11, 1944 |
| 2,610,703 | Pollock | Sept. 16, 1952 |